(12) United States Patent
Magidson et al.

(10) Patent No.: US 10,834,980 B2
(45) Date of Patent: Nov. 17, 2020

(54) PLEATED FILTERING FACE PIECE RESPIRATOR

(71) Applicants: Mark Magidson, Los Angeles, CA (US); Crest Turdjian, Los Angeles, CA (US)

(72) Inventors: Mark Magidson, Los Angeles, CA (US); Crest Turdjian, Los Angeles, CA (US)

(73) Assignee: MOLDEX-METRIC, INC., Culver City, CA (US)

( * ) Notice: Subject to any disclaimer, the term of this patent is extended or adjusted under 35 U.S.C. 154(b) by 1062 days.

(21) Appl. No.: 13/999,345

(22) Filed: Feb. 13, 2014

(65) Prior Publication Data

US 2014/0216477 A1    Aug. 7, 2014

Related U.S. Application Data

(63) Continuation of application No. 12/807,662, filed on Sep. 9, 2010, now abandoned.

(51) Int. Cl.
| | |
|---|---|
| *A41D 13/11* | (2006.01) |
| *A62B 23/02* | (2006.01) |
| *B29C 43/02* | (2006.01) |
| *B29C 43/20* | (2006.01) |

(52) U.S. Cl.
CPC ...... *A41D 13/1115* (2013.01); *A41D 13/1146* (2013.01); *A62B 23/025* (2013.01); *B29C 43/021* (2013.01); *B29C 43/203* (2013.01)

(58) Field of Classification Search
CPC .............. A61M 16/06; A61M 16/0611; A61M 16/0616; A61M 16/0622; A61M 16/0627; A41D 13/11; A62B 23/02; A62B 23/025
See application file for complete search history.

(56) References Cited

U.S. PATENT DOCUMENTS

| | | | | |
|---|---|---|---|---|
| 2,858,828 A | * | 11/1958 | Matheson | A62B 18/025 128/207.12 |
| 4,641,645 A | * | 2/1987 | Tayebi | A41D 13/1146 128/206.19 |
| 4,807,619 A | * | 2/1989 | Dyrud | A41D 13/1146 128/206.16 |
| 5,553,608 A | * | 9/1996 | Reese | A41D 13/1115 128/206.19 |

(Continued)

*Primary Examiner* — LaToya M Louis
(74) *Attorney, Agent, or Firm* — Charles H. Schwartz

(57) ABSTRACT

A pleated molded filtering face piece respirator to be worn upon the face of a wearer and for providing filtering including at least one layer of moldable flexible plastic material formed from openwork flexible plastic material for providing a plurality of perforations for allowing for the free passage of air through the openwork plastic. A layer of moldable filter material for filtering impurities in the air, the one layer of flexible plastic material formed from openwork flexible plastic material and the layer of filter material for filtering impurities in the air lying one on top of the other to form a moldable multilayer of flexible plastic material and filter material. The moldable multilayer of flexible plastic material and filter material are pleated into pleated material and molded to form the pleated filtering face piece respirator to a desired configuration where the one layer of openwork flexible plastic material forms a support layer to carry the layer of filter material.

24 Claims, 4 Drawing Sheets

(56) References Cited

U.S. PATENT DOCUMENTS

| | | | | | |
|---|---|---|---|---|---|
| 5,701,893 | A | * | 12/1997 | Kern | A41D 13/1123 128/206.19 |
| 5,763,078 | A | * | 6/1998 | Braun | A62B 23/02 128/206.11 |
| 6,827,764 | B2 | * | 12/2004 | Springett | A41D 13/1146 264/239 |
| 2006/0266364 | A1 | * | 11/2006 | Turdjian | A41D 13/11 128/206.19 |
| 2008/0011303 | A1 | * | 1/2008 | Angadjivand | A41D 13/113 128/206.19 |
| 2008/0026659 | A1 | * | 1/2008 | Brandner | B01D 39/1623 442/327 |
| 2009/0078265 | A1 | * | 3/2009 | Gebrewold | A62B 18/025 128/206.19 |
| 2010/0078379 | A1 | * | 4/2010 | Rocklitz | B01D 25/26 210/493.1 |
| 2011/0123775 | A1 | * | 5/2011 | Westwood | D04H 1/4382 428/172 |

* cited by examiner

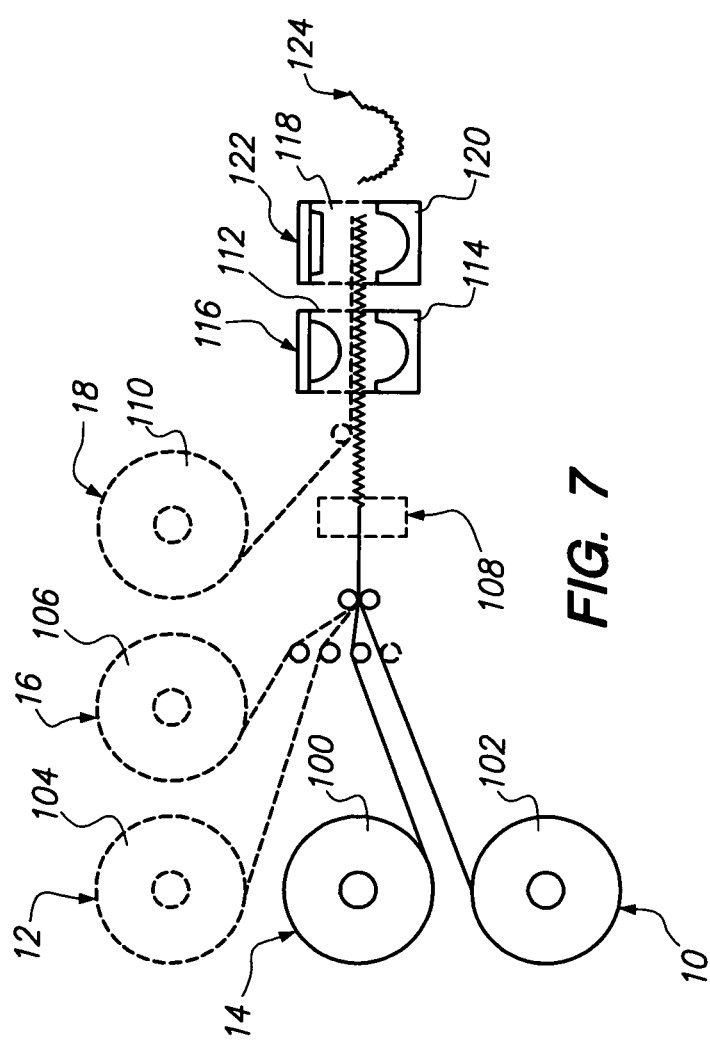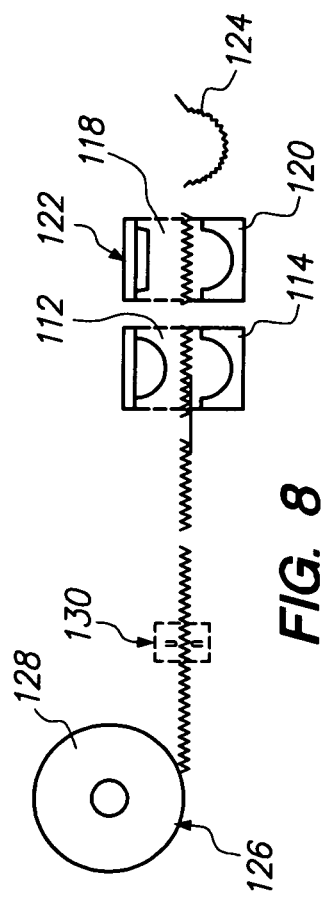

PLEATED FILTERING FACE PIECE RESPIRATOR

This Continuation Application is based on U.S. application Ser. No. 12/807,662 filed on Sep. 9, 2010 by Mark Magidson and Crest Turdjian for Improved Pleated Filtering Face Piece Respirator.

BACKGROUND OF THE INVENTION

The present invention relates to a pleated filtering face piece respirator and in particular to a pleated filtering face piece respirator formed from a plurality of layers and with the individual layers serving different functions. In the filtering face piece respirator of the present invention, at least one layer is formed of an openwork pleated flexible plastic material and serves as a support layer for carrying at least another layer of pleated filter material. It will be appreciated that the pleats may be close together or just slightly undulated so as to increase the surface area of the filter material. In a particular embodiment of the invention, a pair of layers of openwork pleated flexible plastic material form the support for the pleated filter layer, and with the layer of pleated filter material sandwiched in between the layers of pleated openwork plastic material. The pleating of the various layers of the filtering face piece respirator allow for the filtering face piece respirator to conform and seal the filtering face piece respirator at the periphery of the mask to the face of the user while allowing the mask to expand within the periphery of the mask in accordance with movements of the face of the user.

The great majority of molded filtering face piece respirators are made from a flat layer, or multiple flat layers of melt blown filter media that include carrier materials to protect the media and provide a structure for the wearer. These constructions are fairly rigid in nature, meaning that one cannot stretch the materials significantly between any two fixed points on the respirator.

Providing a flexible elastic structure for a filtering face piece respirator would constitute an improvement over what as been available in filtering face piece respirator design. The current invention allows for flexibility in the face piece that before now has not been available, as well as other structural advantages that will greatly benefit the user.

Creating pleats in filter media is a process that has been used extensively for filtration both for face pieces and other filters as well, such as automotive air filters and air-conditioning filters. While pleating has been used sparingly in molded filtering face piece respirators, such constructions have been relatively rigid or non-resilient in nature. Removing the rigid materials from the pleated filter media, or forming the materials in a way that creates both flexibility and resilience, results in a significant step forward in filtering face piece respirator constructional benefits. By encapsulating the media in a resilient polymer netting, the construction has enough resilience and structure to cause the pleated filter media to both easily expand and easily contract during facial movement, allowing for improved facial contact as well as allowing the respirator to potentially fit a wider range of facial sizes. The resilient polymer netting or nettings serving as the carrier for the filter material is of sufficient resilience to return to its original three dimensional form when not under stress but flexible enough to conform to the facial movements of the user.

Additionally, the extra surface area provided by the pleats has the benefit of improving filter performance by increasing surface area, which not only has a direct relationship with ease of breathing, but also allows the respirator to expand and contract, and will fit a wider arrange of faces comfortably than a respirator that does not have this structure.

The preferred construction consists of at least one layer of melt-blown polypropylene filter media covered by at least one layer of resilient plastic netting. A resilient polymer material containing at least about 15% EVA is optimal, with a basis weight of about 20 grams/sq. meter or higher, depending on the weight of the desired filter media. When a high level of filtration is required it is necessary to make the filter media of a higher basis weight, either by using heavier melt blown media or using multiple layers of lighter weight media. In the present invention a higher weight filter media requires a higher weight plastic netting and vice versa to provide the necessary balance of flexibility and resilience.

The inner layer, which contacts the skin, is preferably covered by a spun bond non-woven material that is traditionally non-elastic in its stretch properties, however when pleated in concert with the rest of the materials, the spun bond material retains the resilience and spring like quality of the mesh covered filter media.

Another embodiment attaches an unpleated spun bond material to the periphery of the inner molded mask construction. However, in this embodiment the spun bond material or fabric has significant elongation properties that allow it to expand and contract with the rest of the pleated mask during facial movement. Yet another embodiment attaches either a foamed in place or welded soft flange around the respirator's periphery or a portion of the periphery that is stretchable enough to accommodate the respirator's flexibility.

With the filtering face piece respirator of the present invention, the use of the openwork pleated plastic material provides for a flexible yet shape-retaining carrier support for the pleated filter material. Moreover, since the pleated plastic material has an openwork configuration that provides for a plurality of perforations, the openwork pleated plastic material allows for the generally unrestricted passage of a high volume of air. Since the openwork pleated plastic allows for the passage of a high volume of air, the filtering face piece respirator of the present invention is comfortable to wear since the breathing of the wearer is not unduly restricted.

The layer of pleated filter material may be of any of the general types of filter material commonly used with filtering face piece respirators for providing for the filtering of particular impurities in the air. The filter material may be formed from various types of filter materials, such as non-woven polyester fiber, electrostatically charged polypropylene, activated charcoal or other additives, various types of natural fibers and other filter materials currently used. Many of the filter materials currently used to provide the filter portion of filtering face piece respirators cannot stand a high degree of heat since the heat may reduce or eliminate the filtering properties of the material. With the present invention, the filtering face piece respirator may be formed using the method of U.S. Pat. No. 4,850,347 which patent describes a technique that does not subject the filter material to a high degree of heat, so that the filtering properties of the filter material are not substantially affected.

With the filtering face piece respirator of the present invention, the pleated filter material may be relatively thick and yet still be properly supported by the carrier layers of openwork-pleated plastic. In addition, the filter material currently used may not be shape retaining or self supporting, so it is necessary to use some sort of carrier means to provide for the support of the pleated filter material.

In the pleated filtering face piece respirator of the present invention, the openwork pleated plastic material may be formed from a plastic sheet that has a pattern of openings or may be formed from a sheet of woven material or may be formed from a sheet of mesh material. In particular, the openwork plastic layer may be formed from various plastic materials such as vinyl, polyethylene, synthetic or real rubber or other materials or combinations of materials. As an example, the openwork plastic layer has been formed from ethyl vinyl acetate polypropylene blend.

In a first particular embodiment of the present invention, the pleated filtering face piece respirator is formed from four layers of material and specifically includes a pair of openwork flexible plastic layers serving to support a layer of filter material in between the openwork plastic layers. A fourth inner layer of a soft material serves as a layer positioned against the face of the wearer of the mask. This soft material provides additional comfort to the wearer of the filtering face piece respirator. The fourth inner layer may be pleated with the other layers or may be formed of a stretchable material that can expand with expansion of the pleats as described above. In the simplest embodiment of the invention, a single sheet of openwork pleated flexible plastic is formed to carry and to act as a support for a layer of pleated filter material.

The present invention therefore is directed to a pleated filtering face piece respirator that allows for the use of different types of filter material to provide for the desired degree of filtering while at the same time allowing for a considerable volume of air to pass to the wearer of the mask. The pleated filtering face piece respirator of the present invention includes at least a single layer of pleated openwork flexible plastic material supporting and carrying at least one layer of pleated filter material. The pleated filtering face piece respirator of the present invention may include an additional layer of pleated openwork plastic material to provide for additional support and an additional layer of a soft fabric material to provide for comfort. The present invention includes various means for sealing the peripheral edge of the filtering face piece respirator. A clearer understanding of the present invention will be had with reference to the following description and drawings wherein:

FIG. 7 illustrates a first method for forming the pleated filtering face piece respirator of the present invention;

FIG. 8 illustrates a second method for forming the pleated filtering face piece respirator of the present invention;

Figure 1:
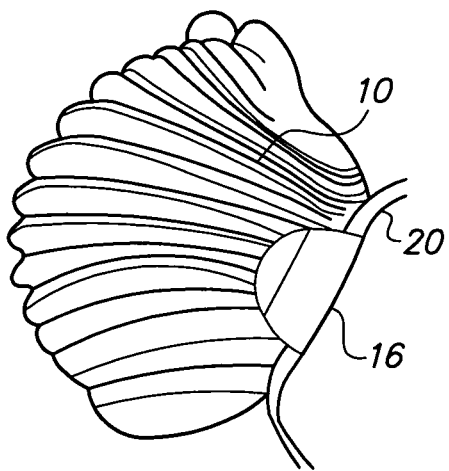
FIG. 1 is a perspective view of a first embodiment of a pleated filtering face piece respirator constructed in accordance with the teachings of the present invention.
Figure 2:
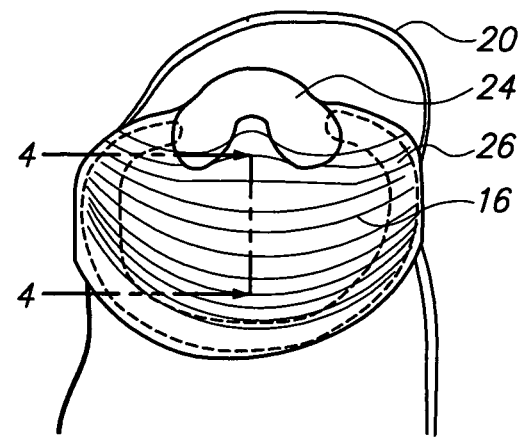
FIG. 2 is a back view of the first embodiment of the invention.
Figure 3:
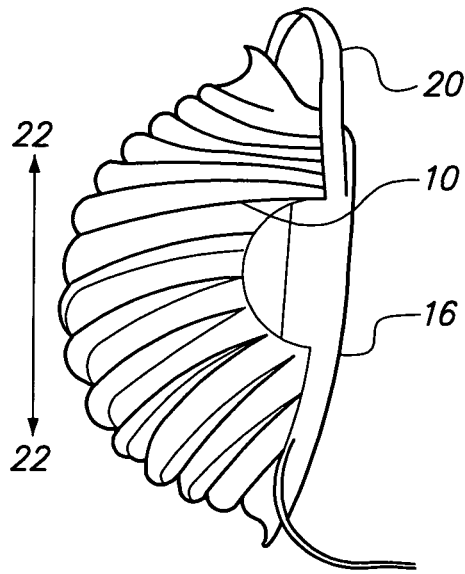
FIG. 3 is a side view of the first embodiment of the invention.
Figure 4:
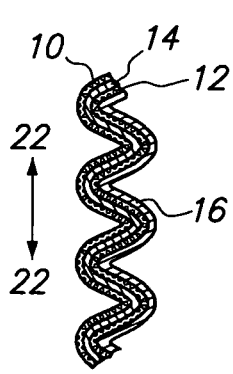
FIG. 4 is a side cross-sectional view taken along lines 4-4 of FIG. 2.
Figure 5:
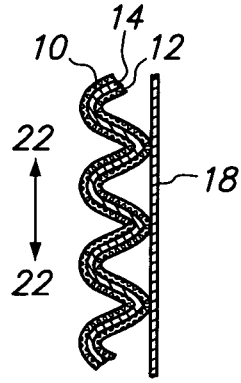
FIG. 5 is a side cross-sectional view similar to FIG. 4 of an alternate structure of the pleated filtering face piece respirator of the present invention and including an inner expandable spun bond layer.

FIGS. 1 through 6 illustrates first embodiment of the pleated filtering face piece respirator of the present invention with alternate constructions. As shown in FIGS. 1-3, the pleaded respirator has the pleats oriented horizontally relative to the face of the used of the respirator. The filtering face piece respirator in one construction includes four layers of material. Specifically, a pair of pleated openwork flexible plastic layers 10 and 12 that sandwich a layer of pleated filter material 14. A layer of a soft fabric, which may be pleated fabric 16 as shown in FIG. 4 or un-pleated elastic fabric 18 as shown in FIG. 5, is positioned on the inside surface of the filtering face piece respirator and provides for additional comfort for the wearer of the filtering face piece respirator. An elastic band 20 may be attached to the side of the respirator and is used to support the filtering face piece respirator in position against the face of the user.

The pleated openwork plastic layers 10 and 12 provide for support layers to carry the filter material 14. In particular, the openwork plastic layers may be formed from sheets that have a plurality of openings therethrough to permit the free passage of air. For example, the openwork plastic layers may be formed from a perforated plastic material, a woven plastic material, a mesh plastic material, etc. In general, the plastic material is of the type that can be molded to a desired contour configuration and will retain that configuration so as to support the filter material, yet at the same time being flexible enough as shown by arrows 22 to allow for the filtering face piece respirator to flex by opening and closing movement of the pleats in the direction of the arrows 22 to conform to different facial contours and facial movements of individual wearers of the mask. Specifically, the openwork plastic layers may be composed of various types or combinations of plastic materials such as vinyls, polyethylenes, synthetic rubber, etc., which allow for moldability to form the desired configuration yet with flexibility to allow for the pleated shaped mask to fit the face of individual wearers.

The filter layer 14 may be formed from any of the known types of filter materials such as non-woven polyester fiber material, electrostatically charged polypropylene, activated charcoal, various natural fibers such as merino wool, or other types of materials used for filtering. Many of these different types of filter material cannot withstand high heat, since the high heat would tend to destroy the filtering properties of the material. The method of forming the filtering face piece respirator as described in U.S. Pat. No. 4,850,347 may be used so the filter layer 14 is not subjected to high heat.

In the construction of the first embodiment of the filtering face piece respirator shown in FIGS. 1 through 4, the pleated inner layer 16 of a soft fabric is provided for comfort. This layer may be formed of material such as spun bond that will adhere to the inner layer of openwork plastic during the molding process. An alternate construction of the filtering face piece respirator is shown in FIG. 5. In this construction the un-pleated inner layer 18 is also formed of a soft fabric for comfort. This layer may be formed of material such as an elastic spun bond that will adhere to the inner tops of the pleated layer of openwork plastic during the molding process and can stretch to match opening and closing movement of the pleated layers. As an example, the elastic spun bond may be formed of propylene-based elastomers.

Other constructions of the first embodiment of the pleated filtering face piece respirator of the present invention show various means for sealing the peripheral edge portion of the filtering face piece respirator to the face of the user. In FIG. 2, a nosepiece 24 is shown to provide additional sealing around the nose portion of the user. Also, as shown by dotted line flange portion 26, a flange may be attached around the periphery of the respirator to provide sealing to the face of the user. This additional sealing provides for a closer fitting of the mask to the face of the user. As an alternative to the flange shown in FIG. 2, the edge portion of the filtering face piece respirator may be sealed by an attached soft molded gasket member. This gasket member would not only provide for a seal of the edge portion, thereby preventing the layers from separating, but also the gasket may provide for a tighter seal of the mask against the face of the wearer. The gasket member may be attached to the edge portion after the molding of the respirator or may be molded in place.

Figure 6:
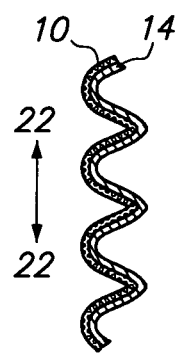
FIG. 6 is a side cross-sectional view similar to FIG. 4 of an alternate structure of the pleated filtering face piece respirator of the present invention with a simpler construction.

FIG. 6 illustrates a portion of a third alternate construction of the first embodiment of the filtering face piece respirator of the present invention and in particular shows a pleated filtering face piece respirator having the simpler construction than the first and second alternate constructions of the first embodiment and includes just two layers of material. Specifically, in the construction of FIG. 6, the first layer of pleated openwork flexible plastic material 10 forms a support carrier for the second layer of pleated filter material 14. The layers 10 and 14 may be constructed using the materials described above, and an elastic band may be attached so as to hold the filtering face piece respirator in position.

It is to be appreciated that the structure of FIG. 6 contemplates the use of pleated filter material 14, which will at least to some degree be held in place with the one layer of plastic material even though the filter material is not sandwiched between two layers of plastic material. As an example, if the layer of filter material 14 is formed from a natural fiber, such as merino wool, then this layer may be comfortably positioned against the face of the wearer. It is also to be appreciated that the relative positions of the layers 10 and 14 may be reversed and with the filter material on the outside. Since the construction of the filtering face piece respirator shown in FIG. 6 is simpler in structure and materials, it would be less costly than the constructions shown in FIGS. 1 through 5. However, the filtering face piece respirator of FIG. 6 would not be able to withstand the same degree of wear as the constructions of FIGS. 1 through 5.

FIG. 7 illustrates a first method of making the pleated filtering face piece respirator of the present invention and specifically a method of molding the filtering face piece respirator to the desired contour configuration. In the method as shown in FIG. 7, the filter material 14 may be provided in a roll 100, as a first step. As a second step, the filter material 14 may be inserted between top and bottom sheets of openwork plastic material 10 and 12, also supplied in rolls 102 and 104, for the first and second embodiments of the invention. In the third simpler embodiment of the invention, only plastic material 10 is used so the roll 104 that contains the plastic material 12 is shown in dotted line.

As a third step, soft fabric 16 in a roll 106 may be inserted adjacent the plastic material 12 for the first embodiment of the invention. The roll 106 is shown in dotted form since in the second and third embodiments of the invention, the spun bond fabric 16 is not used. As the next step, all of the layers of material are now brought to a pleater 108 to form the pleated multilayered material that is used for molding the respirator of the present invention. If the second embodiment of the invention is to be made, then after pleating by the pleater 108, stretchable fabric 18 on a roll 110 shown in dotted line is inserted as the next step prior to forming the respirators.

In the next step, molds 112 and 114 in a forming station 116, are brought together to capture for the first and second embodiments of the invention, the pleated sheets of plastic material 10 and 12, the filter material 14 and the fabric 16 or 18, so as to provide for molding of individual pleated filtering face piece respirators. All of the particular embodiments of the pleated filtering face piece respirator described above such as the third embodiment and any variants may be made by the above method as long as at least one layer of the openwork flexible plastic material is used to carry and support the filter material so as to allow for a high volume of air to pass through the opening in the pleated openwork plastic material.

As a final step, the individual filtering face piece respirators may be cut from the large sheets and the edges may be sealed using sealing and cutting members 118 and 120 in a sealing and cutting station 122. This forms the individual pleated face piece respirators of the present invention as shown by individual pleated face piece respirators 124.

As an alternative to the method of FIG. 7, the method of FIG. 8 may be used wherein multilayered pleated material 126 in any of its alternate forms as shown in FIG. 7 may be stored in a roll 128. The pleated material 126 may then in a first step pass through a cutting station 130 to be cut into individual pieces for forming into pleated face piece respirators 124. This is accomplished using the same forming and sealing and cutting stations 116 and 122 of FIG. 7.

Figure 9:
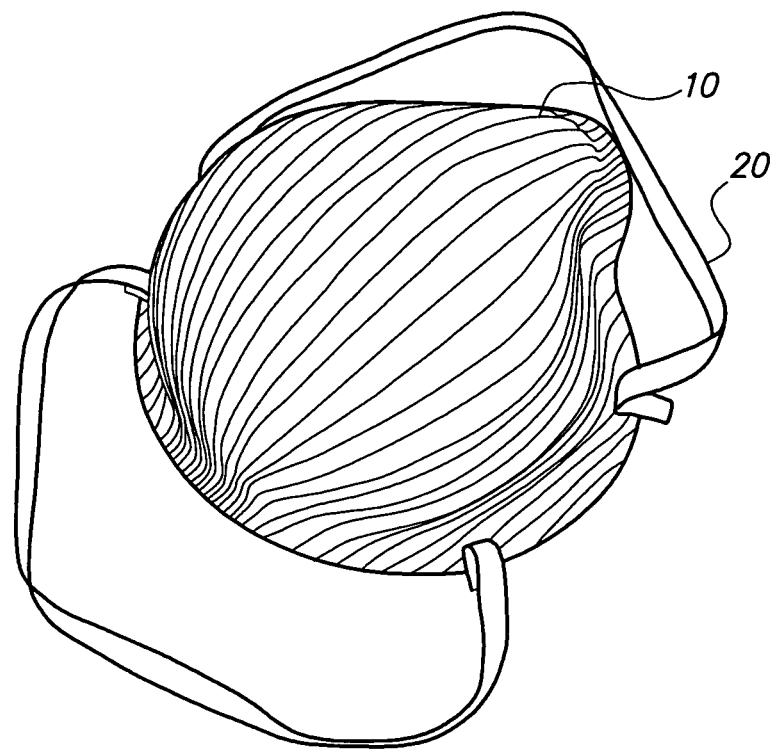
FIG. 9 is a perspective view of a second embodiment of a pleated filtering face piece respirator constructed in accordance with the teachings of the present invention.
Figure 10:
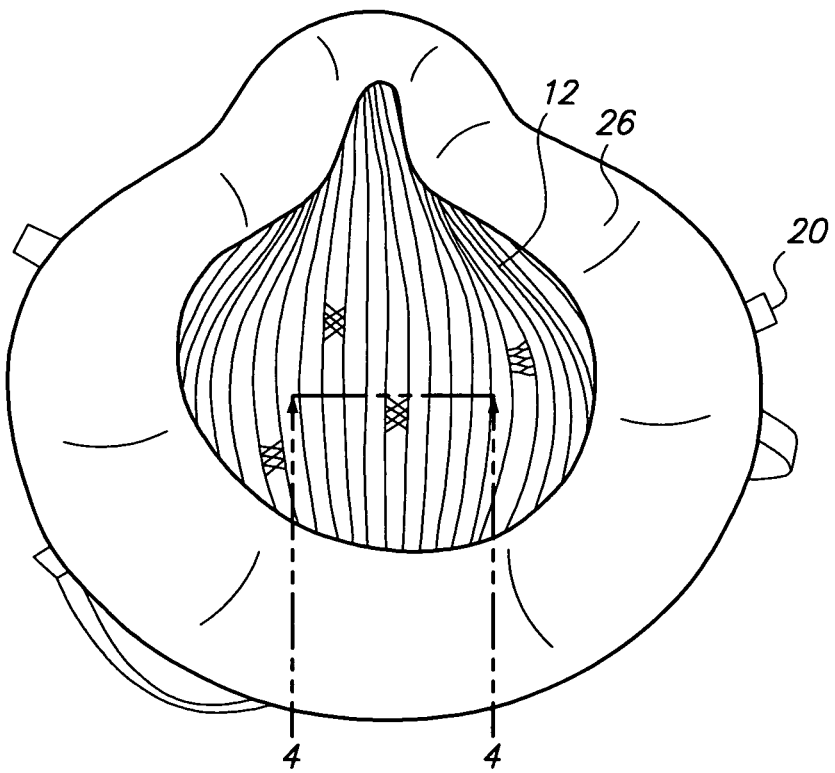
FIG. 10 is a back view of the second embodiment of the invention.
Figure 11:
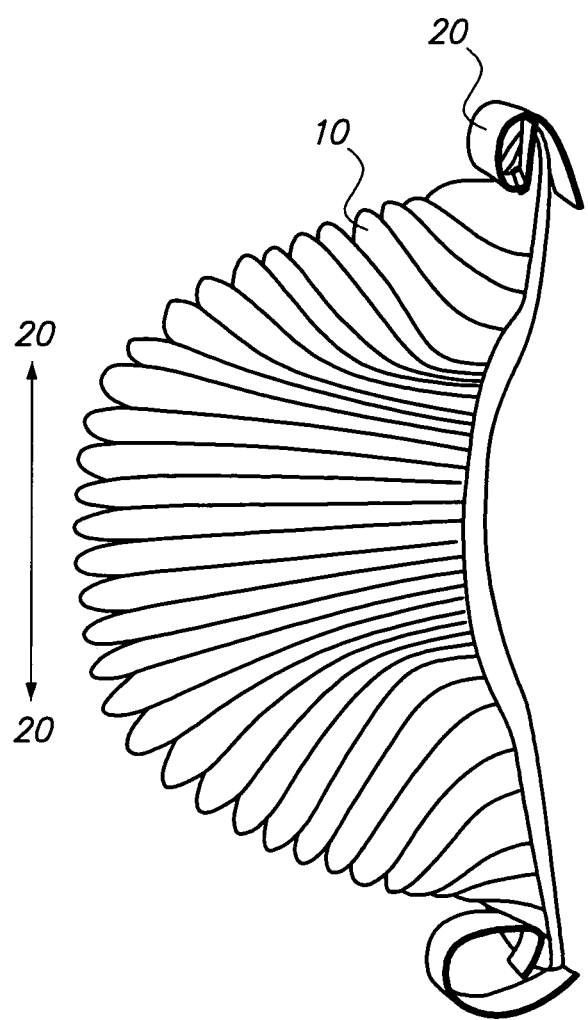
FIG. 11 is a top view of the second embodiment of the invention.

FIGS. 9 through 11 illustrate a second embodiment of the pleated filtering face piece respirator of the present invention with the pleats oriented vertically relative to the face of the user of the respirator. The various materials used are the same for the constructions of the second embodiment as for the constructions of the first embodiment and the same reference numerals are used for both. The pleated filtering face piece respirator of FIGS. 9-11 in one construction includes four layers of material. Specifically, a pair of pleated openwork flexible plastic layers 10 and 12 can sandwich a layer of pleated filter material 14. A layer of a soft fabric, which may be pleated fabric 16 as shown in FIG. 4 or un-pleated elastic fabric 18 as shown in FIG. 5, is positioned on the inside surface of the filtering face piece respirator and provides for additional comfort for the wearer of the pleated filtering face piece respirator.

An elastic band 20 may be attached to the side of the respirator and is used to support the filtering face piece respirator in position against the face of the user. In the first embodiment, the elastic band 20 is attached by passing the band through a folded over portion of the respirator while in the second embodiment, the band is stapled onto the periphery of the respirator.

Figure 12:
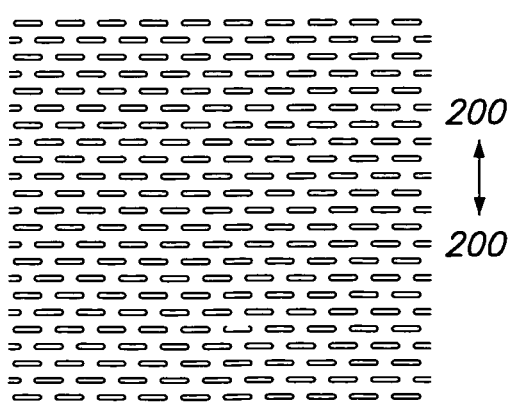
FIG. 12 illustrates an alternate elastic fabric material.

In the construction of the second embodiment of the filtering face piece respirator shown in FIGS. 9 through 11, the pleated inner layer 16 of the soft fabric is provided for comfort. This layer may be formed of material such as spun bond that will adhere to the inner layer of openwork plastic during the molding process. An alternate construction of the filtering face piece respirator is shown in FIG. 5. In this construction the un-pleated inner layer 18 is also formed of a soft fabric for comfort. This layer may be formed of material such as an elastic spun bond that will adhere to the inner tops of the pleated layer of openwork plastic during the molding process and can stretch to match opening and closing movement of the pleated layers. As an example, the elastic spun bond may be formed of propylene-based elastomers. As an alternative to the use of this specific material, ordinary spun bond fabric can be made to be elastic by perforating the spun bond in the manner shown in FIG. 12. This allows the perforated fabric to expand in the direction shown by the arrows 200.

In FIG. 2, as shown by dotted line flange portion 26, a flange may be attached around the periphery of the respirator to provide sealing to the face of the user. FIG. 10 illustrates this flange 26 providing for a closer fitting of the mask to the face of the user.

FIG. 6 illustrates a portion of a third alternate construction of the first embodiment of the filtering face piece respirator of the present invention that may also be used for the second embodiment of the invention. The second embodiment of the invention may be manufactured using the methods illustrated in FIGS. 7 and 8. In addition, the improved pleated filtering face piece respirator of the present invention may also be constructed using pleats running in multiple vertical directions to provide flexibility in multiple directions. The pleats may be in different portions of the respirator or may be superimposed. The pleats may be horizontal, vertical or at any angular direction.

The present invention, therefore, provides for an improved filtering face piece respirator providing for both desirable filter characteristics yet allowing the masks to conform to the configuration of the face of the wearer and also allowing for a relatively high volume of air to pass through the mask to the wearer of the mask.

Although the invention has been described with reference to particular embodiments, it is to be appreciated that various adaptations and modifications may be made, and the invention is only to be limited by the appended claims.

We claim:

1. A method of making a flexible pleated filtering face piece respirator to be worn on the face of a wearer, having an overall structure of continuous, adjacent and unopposed pleats to allow the face piece to expand and contract to any facial movement, and for providing filtering including the following steps,
providing at least one layer of flexible plastic material formed from openwork flexible plastic material that provides support and for providing a plurality of perforations for allowing for the free passage of air through the openwork plastic,
providing a layer of filter material for filtering impurities in the air,
positioning the at least one layer of flexible plastic material formed from openwork flexible plastic material and the layer of filter material for filtering impurities in the air to lie one on top of the other to form a multilayer of flexible plastic material and filter material where the flexible plastic material provides support for the filter material,
providing a pleater for pleating sheet material into pleated material having an overall structure of continuous, adjacent and unopposed pleats,
moving the multilayer of flexible plastic material and filter material to the pleater,
pleating the multilayer of flexible plastic material and filter material to form a pleated composite layer of flexible plastic material and filter material having an overall structure of continuous, adjacent and unopposed pleats,
providing male and female molding members having a mold configuration conforming generally to the contours of the face of the wearer,
moving the pleated composite layer of flexible plastic material and filter material, between the male and female molding members, and
pressing the male and female molding members together to form the pleated filtering face piece respirator to the desired configuration by molding the at least one layer of openwork flexible plastic material to form a support layer to carry the layer of filter material and having an overall structure of continuous, adjacent and unopposed pleats to allow the face piece to expand and contract to any facial movement.

2. The method of claim 1 wherein two layers of openwork flexible plastic material are provided and wherein the layer of filter material is sandwiched between the layers of openwork flexible plastic when the male and female molding members are pressed together.

3. The method of claim 2 additionally including the step of providing a layer of soft fabric and positioning the layer of soft fabric adjacent an inner one of the two layers of openwork flexible plastic material prior to the step of pleating for covering an inner surface of the pleated filtering face piece respirator.

4. The method of claim 2 additionally including the step of providing a layer of soft elastic fabric and positioning the layer of soft fabric adjacent an inner one of the two layers of openwork flexible plastic material after the step of pleating for covering an inner surface of the pleated filtering face piece respirator with the soft elastic material.

5. The method of claim 4 wherein the soft elastic material is formed as a propylene-based elastomer.

6. The method of claim 4 wherein the soft elastic material is formed as a perforated spun bond.

7. The method of claim 2 additionally including the step of heating the peripheral edges of the pleated layers of openwork flexible plastic and filter material to seal the peripheral edge of the filtering face piece respirator.

8. The method of claim 2 additionally including the step of precutting the pleated layer of openwork flexible plastic and filter material to a particular configuration prior to the molding step.

9. The method of claim 2 additionally including the step of attaching a flange around the peripheral edge of the filtering face piece respirator.

10. The method of claim 1 additionally including the step of providing a layer of soft fabric and positioning the layer of soft fabric adjacent an inner one of the layers of openwork flexible plastic material and filter material prior to the step of pleating for covering an inner surface of the pleated filtering face piece respirator.

11. The method of claim 1 additionally including the step of providing a layer of soft elastic fabric and positioning the layer of soft fabric adjacent an inner one of the layers of openwork flexible plastic material and filter material after the step of pleating for covering an inner surface of the pleated filtering face piece respirator with the soft elastic material.

12. The method of claim 11 wherein the soft elastic material is formed as a propylene-based elastomer.

13. The method of claim 11 wherein the soft elastic material is formed as a perforated spun bond.

14. The method of claim 1 additionally including the step of heating the peripheral edge of the at least one layer of openwork flexible plastic material and filter material after the step of molding to seal the peripheral edge of the pleated filtering face piece respirator.

15. The method of claim 1 additionally including the step of precutting the pleated layer of openwork flexible plastic and filter material to a particular configuration prior to the molding step.

16. The method of claim 1 additionally including the step of attaching a flange around the peripheral edge of the filtering face piece respirator.

17. A flexible pleated molded filtering face piece respirator to be worn upon the face of a wearer having an overall structure of continuous, adjacent and unopposed pleats to allow the face piece to expand and contract to any facial movement and for providing filtering including,
at least one layer of moldable flexible plastic material forming from openwork flexible plastic material that provides support and for providing a plurality of perforations for allowing for the free passage of air through the openwork plastic,
a layer of moldable filter material for filtering impurities in the air,
the at least one layer of flexible plastic material formed from openwork flexible plastic material and the layer of filter material for filtering impurities in the air lying one on top of the other to form a moldable multilayer of flexible plastic material and filter material where the flexible plastic material provides support for the filter material, and
wherein the moldable multilayer of flexible plastic material and filter material are pleated into pleated material and molded to form the pleated filtering face piece respirator to a desired configuration wherein the at least one layer of openwork flexible plastic material forms a support layer to carry the layer of filter material and having an overall structure of continuous, adjacent and unopposed pleats to allow the face piece to expand and contract to any facial movement.

18. The flexible pleated molded filtering face piece respirator of claim 17 including two layers of openwork flexible plastic material and wherein the layer of filter material is sandwiched between the two layers of openwork flexible plastic when the two layers of openwork flexible plastic material are molded to form the pleated filtering face piece respirator.

19. The flexible pleated molded filtering face piece respirator of claim 17 additionally including a layer of soft fabric and positioned adjacent an inner one of the layers of openwork flexible plastic material and filter material prior to pleating for covering an inner surface of the pleated filtering face piece respirator.

20. The flexible pleated molded filtering face piece respirator of claim 17 additionally including a layer of soft elastic fabric and positioned adjacent an inner one of the layers of openwork flexible plastic material after pleating for covering an inner surface of the pleated filtering face piece respirator with the soft elastic material.

21. The flexible pleated molded filtering face piece respirator of claim 20 wherein the soft elastic material is a propylene-based elastomer.

22. The flexible pleated molded filtering face piece respirator of claim 20 wherein the soft elastic material is a perforated spun bond.

23. The flexible pleated molded filtering face piece respirator of claim 17 additionally including a sealed peripheral edge of the pleated filtering face piece respirator.

24. The flexible pleated molded filtering face piece respirator of claim 17 additionally including a flange attached around the peripheral edge of the filtering face piece respirator.

* * * * *